United States Patent [19]
Sabatino et al.

[11] 3,937,083
[45] Feb. 10, 1976

[54] TEMPERATURE-COMPENSATING LIQUID METER

[75] Inventors: Daniel D. Sabatino, Paramus; Henry W. Wilkens, Little Ferry, both of N.J.

[73] Assignee: Flowtron Industries Inc., Little Ferry, N.J.

[22] Filed: Jan. 16, 1975

[21] Appl. No.: 541,478

[52] U.S. Cl. ............................... 73/224; 137/391
[51] Int. Cl.² ........................................ G01F 11/00
[58] Field of Search ............ 73/113, 221, 224, 223; 137/391

[56] References Cited
UNITED STATES PATENTS

| | | | |
|---|---|---|---|
| 3,071,002 | 1/1963 | Scott et al. ........................... | 73/224 |
| 3,096,645 | 7/1963 | Hodgson ............................... | 73/223 |
| 3,152,478 | 10/1964 | Hughes et al. ....................... | 73/223 X |
| 3,714,823 | 2/1973 | Wilkens et al. ....................... | 73/113 |

*Primary Examiner*—Donald O. Woodiel
*Assistant Examiner*—John P. Beauchamp
*Attorney, Agent, or Firm*—Elliott I. Pollock

[57] ABSTRACT

An automatic, temperature-compensated liquid or fuel metering device comprises a measuring chamber having a pair of magnetically responsive vertically spaced reed switches therein which are selectively actuated by a magnetcarrying float to control valves associated with the chamber to supply a predetermined increment of liquid to the chamber and thereafter to drain that increment from the chamber into a reservoir. The volume of each increment is dependent upon the spacing between the reed switches, and that spacing is controlled by a bellows having a sample of the liquid being measured sealed therein, the bellows being disposed in the path of flow of liquid to the chamber and being operative to vary the volume of said increments with variations in the temperature of the liquid being measured.

16 Claims, 5 Drawing Figures

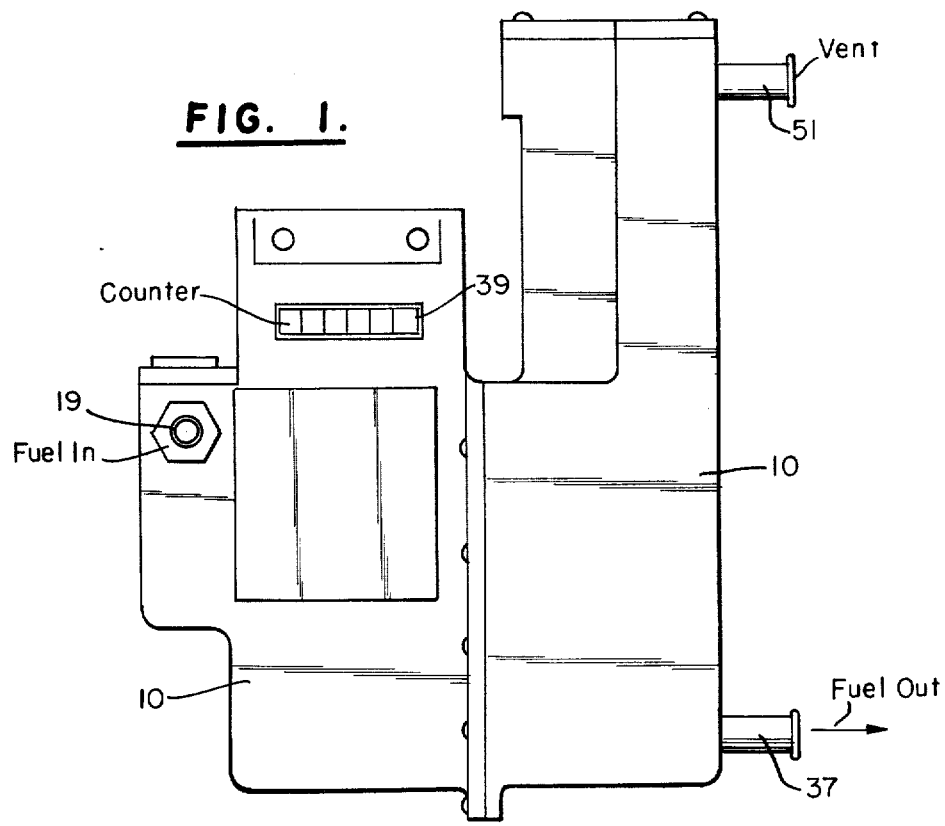
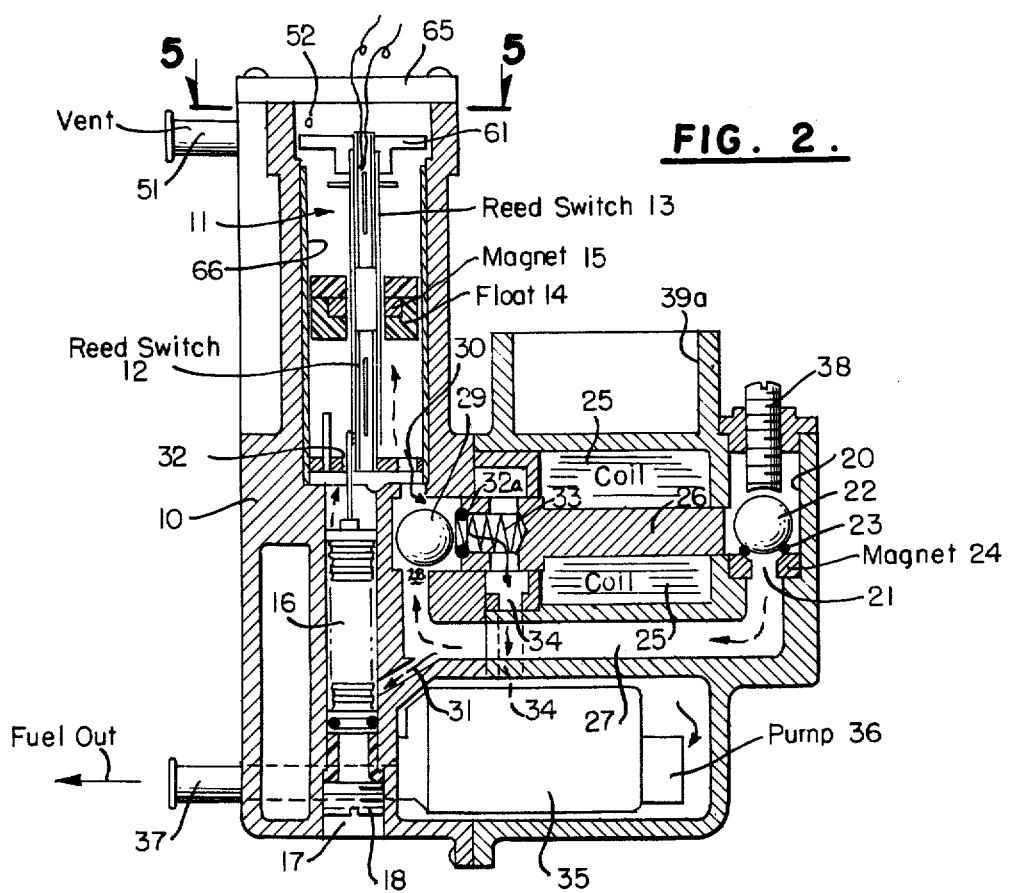

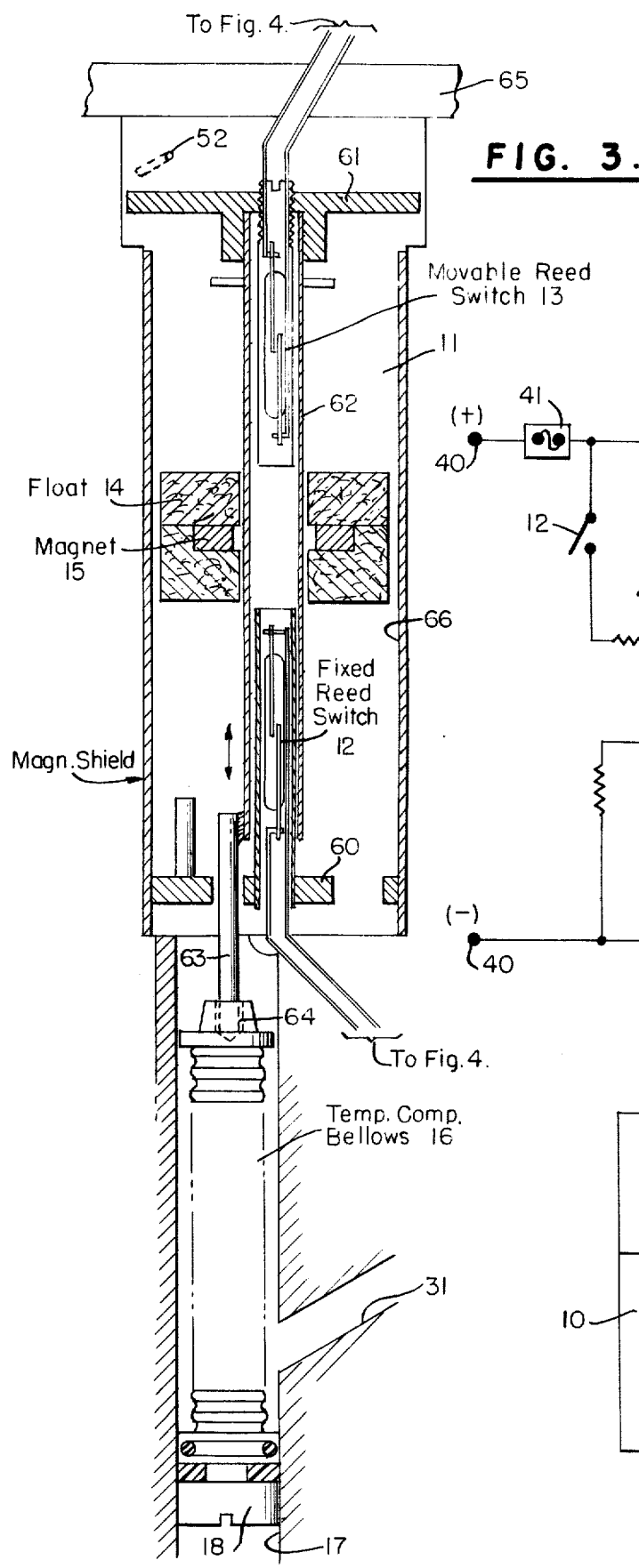
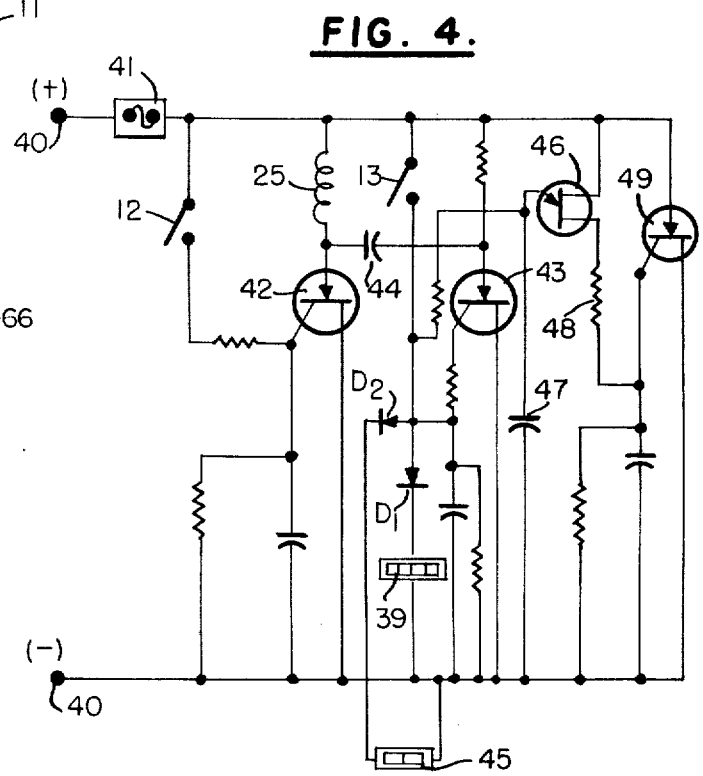
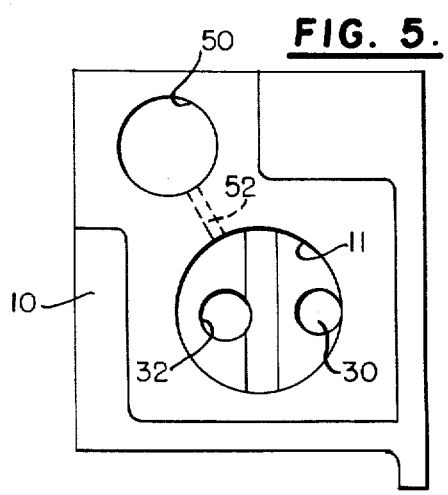

TEMPERATURE-COMPENSATING LIQUID METER

BACKGROUND OF THE INVENTION

The present invention relates to a liquid meter of the general type contemplated by our prior U.S. Pat. No. 3,714,823, issued Feb. 6, 1973, for "Fuel Consumption Meter" wherein a measuring chamber is associated with a reservoir and with appropriate controls operative to provide a predetermined accurate increment of liquid to the measuring chamber and thereafter to empty that increment into a reservoir, a counter being provided to count the number of times the measuring chamber is thus emptied. Such a meter, when employed to measure liquid fuel being consumed by a vehicle, supplies highly accurate information regarding fuel consumption which information can be used to determine miles per gallon when the vehicle is moving and/or to recover state road-use taxes on fuel used for purposes other than vehicle movement. The present invention is primarily directed to an improved form of meter of the general type disclosed in said prior patent, or in other types of meter which rely upon the measurement of volumetric increments of liquid, wherein the volume of such increments is made dependent upon and adjusted to compensate for variations in the temperature of the liquid being measured thereby to provide an automatic correction of the fuel measurement back to a preselected standard.

Various forms of liquid meters have been suggested heretofore which include provision for recording and/or somehow utilizing information related to the temperature of the liquid being measured. Such arrangements are disclosed, for example, in the U.S. Pat. to Scott et al Nos. 3,071,022, Goffe 3,000,207, Hebard et al 2,920,483, Banks et al 2,831,350, and Raymond 2,158,381. In these arrangements, and in other arrangements which have been suggested heretofore, no attempt has ever been made to change, automatically, the actual increments which are measured thereby to compensate for changes in temperature and, instead, a customary approach has involved a control of the meter indicator, i.e. where an increase in fuel or liquid flow has resulted from fuel expansion, the meter indication or read-out is simply decreased to compensate for the fuel expansion, and vice-versa.

The present invention relies upon an entirely different concept and approach to temperature compensation, wherein the physical size of a measuring chamber, or its effective size as governed by liquid level sensors therein, is changed in response to changes in temperature of the liquid being measured. Complicated linkages which have been customarily employed heretofore to control the output indicator of the meter are accordingly no longer necessary, and a highly accurate, temperature-compensated fuel or liquid meter is achieved in a structure which is far simpler, less expensive, more rugged, and in many cases more reliable, than has been possible heretofore.

SUMMARY OF THE INVENTION

The meter of the present invention constitutes a digital fuel measuring device which measures an exact increment of fuel (typically 1/100th gallon), supplies that increment to a reservoir, and thereafter remains completely at rest until the increment is consumed, in contrast to other meters suggested heretofore which are essentially analog devices intended to indicate rate of flow. As will be apparent to those skilled in the art, when used as a fuel meter, the device of the present invention makes it possible to supply fuel to the carburetor of a vehicle under constant pressure, and without any significant loss of fuel pressure at the carburetor inlet if there should be an instantaneous demand for fuel, in contrast to positive displacement meters which operate off the pressure of the engine fuel pump and which have an inertia factor to overcome in the event of instant, high fuel demand. By reason of this consideration, the meter of the present invention is adapted for installation in conventional automobiles to provide a measure of gasoline consumption, a result which has not been considered practical in the past in view of the different operating characteristics of the typical positive displacement meter which has been employed heretofore to measure fuel comsumption.

The meter of the present invention comprises a measuring chamber which is located between a liquid supply and a reservoir, and which is associated with selectively operable valve means adapted to feed liquid to be measured along a first flow path from the supply to the chamber and for thereafter selectively draining or withdrawing the liquid from said chamber into the reservoir via a second flow path different from the first flow path. The valve means are controlled by a first sensor (e.g. a reed switch cooperating with a magnet-carrying float) located near the bottom of the measuring chamber and responsive to an absence of liquid in the measuring chamber to open the first flow path and to close the second flow path. The chamber also includes a second sensor (e.g. another reed switch) which is vertically spaced from and located above the first sensor and which is responsive to the filling of liquid or fuel into the chamber to a second level defined by the position of the second sensor for actuating the valve means to close the first flow path and to open the second flow path. This operating sequence of the meter of the present invention causes a predetermined increment of liquid to fill into the measuring chamber and thereafter to drain from that chamber into the reservoir with the volume of the increment being determined by the vertical spacing between the first and second sensors. The filling and subsequent emptying operation occur repetitively as the liquid level in the chamber changes from one to the other of the vertically spaced sensors, and counter means are provided for indicating how many such increments have been drained into the reservoir.

In accordance with the improvement of the present invention, the two sensors are so mounted that their relative spacing may be varied as a function of the temperature of the liquid or fuel being measured, whereby changes in liquid temperature result in a change of the effective volume of the measuring chamber, thereby to vary the volume of said increments. When used to measure gasoline or diesel fuel, the volume of each increment is so varied as a function of its temperature as to correct the increment back to the petroleum standard of a 60°F gallon, i.e. when the fuel temperature is in excess of 60°F the incremental volumes are correspondingly increased, and when the fuel temperature is below 60°F the incremental volumes are correspondingly decreased. The counter accordingly provides a direct reading of the number of increments (or 1/100th's gallons) of 60°F petroleum which have effectively passed through the meter to the reservoir for consumption by the vehicle engine.

The relative spacing between the sensors in the measuring chamber is adjusted, in accordance with a preferred embodiment of the present invention, by mounting the upper liquid level sensor for vertical displacement, and by connecting that upper sensor to an expansible bellows which is filled with a sample of the liquid being measured. The bellows is located in one of the aforementioned flow paths, e.g. in the path of flow of liquid from the supply to the measuring chamber, so that at least a portion of the liquid being supplied to the chamber passes over the exterior of the bellows. Moreover, the height of the column of liquid in the bellows is identical to the effective distance between the upper and lower reed switches to assure that the temperature correction of the sensor spacing is completely linear. The liquid column provided by the bellows so arranged accordingly assures the simple, infallible, and exact compensation for variations in liquid volume due to changes in liquid temperature.

The meter may be employed to measure gasoline, diesel fuel, home heating oil, alcohol, and various industrial solvents through the simple expedient of changing a liquid-filled bellows adapted for one application with a bellows filled with a different liquid corresponding to a different desired application. For example, it is only necessary to exchange a hi-test gasoline filled bellows with one filled with regular gasoline to change the capability of the meter.

The valve means employed to control the flow of liquid into and out of the measuring chamber preferably comprises a pair of ferrous metal balls (e.g. steel balls) located adjacent orifices in the aforementioned first and second flow paths respectively, and each such ball is selectively displaceable between open and closed flow path conditions under the control of an electromagnet which is selectively energized and de-energized by means of an electric circuit which includes the aforementioned reed switches. The circuit further includes time delay means responsive to prolonged closure of the upper sensor for de-energizing the meter circuit and a submersible electric pump associated with the meter if there should be any malfunction.

The measuring chamber and reservoir of the meter are each vented to the atmosphere to permit the escape of air and vapors from the reservoir and measuring chamber as the aforementioned liquid increments are supplied thereto. This assures that measurement errors which might otherwise result from an accumulation of vapor pressure, are eliminated.

BRIEF DESCRIPTION OF THE DRAWINGS

The foregoing objects, advantages, construction, and operation of the present invention will become more readily apparent from the following description and accompanying drawings in which:

FIG. 1 is a perspective view of a liquid metering device constructed in accordance with the present invention;

FIG. 2 is a cross section of the device shown in FIG. 1, as viewed from the opposite side thereof;

FIG. 3 is an enlarged detail of the temperature compensating arrangement employed in the structure of FIG. 2;

FIG. 4 is a schematic of the control circuit employed in the meter of the present invention; and FIG. 5 is a view taken on line 5—5 of FIG. 1, illustrating a portion of the venting arrangement.

DESCRIPTION OF THE PREFERRED EMBODIMENTS

Referring initially to FIGS. 1 and 2, it will be seen that the meter of the present invention comprises a casing generally designated 10 which includes a vertically upright portion defining a measuring chamber 11 which includes a magnetically responsive reed switch 12 disposed adjacent the lower end thereof and a magnetically responsive reed switch 13 adjacent its upper end. As will be discussed hereinafter, the two reed switches 12 and 13 define liquid levels at which certain valving functions take place to supply a liquid being measured to the measuring chamber 11, and to thereafter withdraw a measured increment of liquid therefrom under the control of a float 14 which has a permanent magnet 15 embedded therein. The vertical spacing between the two reed switches is in turn controlled by a temperature compensating bellows 16 which has a sample of the liquid being measured sealed therein, the bellows 16 being inserted into the casing 10 via an aperture 17 which is closed by a threaded plug 18 functioning to support the bellows 16 at a proper position therein, and adapted to permit a given bellows 16 to be removed and replaced by a like bellows filled with a different liquid to adapt the meter for measurement of said different liquid.

The liquid being measured, which is assumed to be either gasoline or diesel fuel for purposes of the present discussion, is fed to the meter by the engine fuel pump (not shown) via a fuel inlet 19 (see FIG. 1) which supplies fuel to an interior chamber 20 for flow through an orifice 21 under the control of a steel valve ball 22. Ball 22 is normally retained against a rubber seat 23 by the holding force of a permanent magnet 24 to close said orifice 21. The ball 22 is arranged to be displaced from its seat 23, however, against the force of magnet 24, by selective energization of an electromagnet comprising a coil 25 surrounding a core 26 within casing 10 to permit fuel to flow along the flow path indicated by broken line arrows through a passageway 27. Passageway 27 is bifurcated at one end thereof to permit a portion of the incoming fuel to flow directly into the measuring chamber 11 while another portion of the incoming fuel flows past the exterior of bellows 16 and then into said measuring chamber. More particularly, a first portion of the incoming fuel flows through a branch having an orifice 28 associated with a second steel ball 29 which is displaced from said orifice when electromagnet 25, 26 is energized to permit the flow of incoming fuel past ball 29 and through an orifice 30 into measuring chamber 11; and a second portion of the incoming fuel is diverted through a branch 31 to flow past the exterior of bellows 16 and thence upwardly through a second orifice 32 (e.g. see FIG. 5) into the measuring chamber.

As will be more clearly understood from the subsequen description of FIG. 4, the incoming flow conditions described above are initiated when measuring chamber 11 is empty so that float 14 and its associated magnet 15 are positioned adjacent the bottom of the chamber to close lower reed switch 12, and the incoming fuel will continue to flow into chamber 11 until float 14 rises to a position wherein its magnet 15 actuates upper reed switch 13 to de-energize electromagnet 25, 26. When the electromagnet is de-energized, ball 23 is attracted by permanent magnet 24 to close orifice 21 thereby to prevent any further flow of incoming fuel, and ball 29 is moved away from a rubber seat 32a by a spring 33 to open a second flow path (shown in full line arrows) so that fuel may drain from measuring chamber 11 via the aforementioned orifice 30 and thence via a conduit 34 into a reservoir 35 located at the bottom of the casing whence it may be pumped by an electrically energized submersible pump 36 through a fuel output line 37 to the carburetor of the engine with which the meter is associated. In practice the reserve chamber or reservoir 35 normally contains 3/100th's of a gallon of fuel to feed the carburetor, and the chamber is never completely emptied since it is supplied repetitively with measured increments of fuel (e.g. increments of 1/100 gallon) from measuring chamber 11. Fuel is supplied to inlet 19 when the main engine fuel pump is actuated by the engine, and the submersible pump 36 thereafter supplies fuel to the carburetor inlet at a constant pressure.

The operating sequence discussed above is controlled by a solid state, power switching circuit employing silicon controlled rectifiers (see FIG. 4) which circuit is potted and installed in a cavity (not shown) within the meter casing adjacent the back face of the casing. When the vehicle ignition switch is closed, the circuit is energized from the 12 volt D.C. vehicle battery supply 40 via a fuse 41 to control the energization and de-energization of electromagnet coil 25 in dependence upon the operating states of reed switches 12 and 13.

When float 14 and its magnet 15 are disposed adjacent the bottom of the chamber 11, the lower reed switch 12 is closed to initiate conduction of a silicon controlled rectifier 42 disposed in series with coil 25 across the battery supply, thereby energizing coil 25. Energization of coil 25 draws balls 22, 29 toward the opposing ends of electromagnet core 26 to open orifices 21 and 28 and simultaneously to close flow path 34 into the reserve tank. The extent to which ball 22 can be drawn from its seat 23 is determined by an adjustable stop 38 (see FIG. 2) comprising a threaded rod of non-ferrous material which trims the travel of the ball off its seat to set an adjustment of the rate of fuel flow into the meter. This represents a highly desirable, and in many cases necessary, feature since some fuel delivery systems are quite forceful.

Energization of coil 25, and the described displacement of balls 22, 29, causes incoming fuel to flow in part past ball 29 and in further part past the exterior of bellows 16, into measuring chamber 11. Float 14 will therefore rise. When its magnet 15 reaches the level of upper reed switch 13, switch 13 is closed to energize silicon controlled rectifier 43; and, at the same time, a capacitor 44 is discharged across SCR 42 to cut it off by well known commutation action. Closure of upper reed switch 13 also operates to supply a signal via diode $D_1$ to a counter 39 (see FIG. 1) mounted within a housing cavity 39a (see FIG. 2); and the same signal is also available for operation of a remote counter 45 via a diode $D_2$. Each diode may be associated with an amplifier (not shown) comprising a portion of the circuit, if the signal produced is otherwise inadequate to operate the associated counter.

When SCR 42 stops conducting, coil 25 is de-energized, its core 26 is de-magnetized, and ball 22 is drawn back to its seat 23 by the attraction of permanent magnet 24 and is held in a position closing orifice 21 by the pressure of the incoming fuel supplied to fuel inlet 19 by the vehicle fuel pump. Simultaneously, ball 29 is repelled from its seat in the "O" ring at 32 by spring 33 to permit the fuel increment to be drained out of measuring chamber 11 and into lower reservoir 35. As the fuel drains from the measuring chamber, float 14 lowers until its magnet reaches the level of lower reed switch 12, whereafter the entire operating sequence is repeated.

In the normal operating sequence, upper reed switch 13 is held closed for only a brief period of time, a fraction of a second. If it is closed for any significantly longer period of time, e.g. more than one second, this is indicative of a malfunction of the meter. In order to prevent fuel from flooding the measuring chamber and spilling from the vent 51 (to be described) if such malfunction should occur, the reed switch 13 is connected to a unijunction transistor 46 which cooperates with a capacitor 47 and a resistor 48 to provide a time delay circuit which energizes a further, normally non-conductive, silicon controlled rectifier 49 if the upper reed switch 13 is held closed for more than one second. Silicon controlled rectifier 49 is connected in series with fuse 41 across battery supply 40, and its conduction draws sufficient current through fuse 41 to blow the fuse and thereby deactivate both the submersible pump 36 and the meter circuit of FIG. 4.

When a volatile liquid such as gasoline is being measured, the fluid in the line entering the meter normally constitutes a mixture of liquid and vapor. Prior art meters that have measuring elements consisting of pistons, turbines, nutating plates, and spring-loaded wedges are normally intended to respond to liquid pressure during the measurement process, but vapor mixed with the liquid to be measured can also exert pressure on such measuring elements. Since these prior meters cannot differentiate between vapor and liquid passing through them, their response to vapor pressure represents a source of possible error, and if there is a comparatively high percentage of vapor in the liquid being measured, e.g. as may occur in a motor vehicle on a hot day, a comparatively large error can develop in the measurement indication afforded by such meters.

The meter arrangement of the present invention has no component which is motivated by pressure. The magnet 15 employed to actuate the lower and upper reed switches 12, 13 is carried in a float 14 that is supported on the surface of the liquid being measured in the measuring chamber. The reserve chamber 35 is connected through a passageway 50 (see FIG. 5) to a vent outlet 51 (FIGS. 1 and 2) located adjacent the top of casing 10, to vent reservoir 35 to the atmosphere as increments of fuel are supplied thereto and withdrawn therefrom. Vent passage 50 is also connected via a restrictive passageway 52 (see FIGS. 2, 3 and 5), having a diameter of approximately 0.040 inches. The restrictive passageway 52 allows a positive pressure to build in measuring chamber 11 during the fill cycle. As a result, the velocity of the fuel flowing into the measuring chamber 11 is restricted somewhat by the action of restrictive vent 52 to allow time for vapor to rise through the incoming liquid fuel and "bubble out" as the measuring chamber is being filled; and the pressure build up in the chamber 11 further tends to keep the fuel under control and inhibits some vapor formation. All of these factors tend to increase the accuracy of measurement of each fuel increment, and assure that the increment measured represents a completely liquid increment rather than a mixture of liquid and vapor.

The temperature of the fuel to be metered may range anywhere from −65°F in a cold environment to something in excess of 200°F when the ambient temperature under the engine hood is very high and the engine does not have adequate flow of cooling air due to lack of forward motion of the vehicle. This makes it very important, therefore, to compensate for expansion/contraction of fuel entering the meter due to differences in temperature thereof under different operating conditions, and it is highly desirable that such compensation be completely automatic, extremely accurate, and that it be achieved by a simple but reliable mechanism. All of these features are accomplished by the temperature compensating bellows 16, and its cooperation with the aforementioned reed switches. In essence, as previously described, the vertical spacing between the reed switches 12, 13 determines the volume of each fuel increment which is actually permitted to flow into and thereafter emptied from measuring chamber 11, and the volume of each such increment is varied with variations in temperature of the fuel being measured by an arrangement wherein the temperature compensating bellows varies the relative spacing between the reed switches to correct the increments being measured back to the petroleum standard of a 60°F gallon. The details of this portion of the invention are best shown in FIG. 3.

Lower reed switch 12 is attached to a support plate 60 at a fixed position adjacent the bottom of measuring chamber 11, at a level wherein said reed switch 12 is actuated when float 14 is in its lowermost position within said chamber. The upper reed switch 13, in contrast, is adapted to be vertically displaced within chamber 11, is mounted in a displaceable support 61 adjacent the top of the chamber through a threaded hole therein, and is associated with an elongated tubular member 62 which passes through a central hole in float 14 to act as a guide for said float, and which extends in surrounding coaxial relation to lower reed switch 12 for slidable displacement relative to said lower switch. At its lowermost end, tubular member 62 is welded to a rod 63 which extends below measuring chamber 11 and which seats under the force of gravity in a complementary recess 64 at the upper end of bellows 16. Support plate 61, tubular member 62, and rod 63 are held in engagement with the upper end of bellows 16 by gravity so that expansions or contractions of said bellows cause similar upward and downward movements of upper reed switch 62 while permitting the bellows to be readily removed through aperture 17 for replacement by a different bellows to adapt the meter to measurement of different liquids as described previously. If desired, the engagement between rod 63 and recess 64, and the resultant stability of the displaceable reed switch structure within chamber 11, can be enhanced by provision of a compression spring located in the region above support plate 61 and below casing cover plate 65.

Bellows 16 is filled and sealed with precisely the same type of liquid which is to be metered (e.g. regular or hi-test gasoline or diesel fuel), and its mean effective length, i.e. the length of the liquid column within the bellows exclusive of its end seals, is exactly the same at any given temperature as the distance between the closure points of reed switches 12 and 13 in measuring chamber 11. Duct 31 provides the exterior of the bellows with a wash of incoming fuel which thereafter enters the measuring chamber 11 as each fuel increment is supplied to said chamber, and this wash of fuel, taken together with the temperature of the environment in which the meter is located and the heat which radiates from fuel in the various meter cavities, determines the temperature of the liquid column within the bellows and accordingly the mean effective length of the bellows at any given time. Since the position of the upper reed switch is controlled directly by the bellows, reed switch 13 will be raised or lowered directly and linearly in response to variations in incoming fuel temperature, thus increasing or decreasing the distance between the two reed switches to determine the effective volume of measuring chamber 11 between the liquid level sensors therein.

The threaded assembly which mounts upper reed switch 13 in support 61 permits the volume of the measuring chamber to be accurately calibrated when the meter is initially assembled and, upon removal of cover plate 65, is accessible to weights and measures officals for field test/calibration.

The lower support plate 60, and measuring chamber liner 66, are fabricated of ferrous metal to shield reed switches 12, 13 from the magnetic flux of coil 25.

While we have thus described preferred embodiments of the present invention, many variations will be apparent to those skilled in the art. It must therefore be understood that the foregoing description is intended to be illustrative only and not limitative of the present invention, and all such variations and modifications as are in accord with the principles described are meant to fall within the scope of the appended claims.

Having thus described our invention, we claim:

1. A temperature-compensating liquid metering device comprising a supply of liquid to be measured, a liquid reservoir, a measuring chamber between said supply and said reservoir, selectively operable valve means for selectively feeding liquid to be measured along a first flow path from said supply to said chamber and for selectively draining liquid from said chamber into said reservoir via a second flow path different from said first flow path, means for controlling the operation of said valve means comprising first sensor means in said chamber responsive to an absence of liquid in said chamber at a first level determined by the position of said first sensor means for actuating said valve means to open said first flow path and to close said second flow path, second sensor means vertically spaced from and above said first sensor means in said chamber and responsive to the filling of liquid into said chamber to a second level defined by the position of said second sensor means for actuating said valve means to close said first flow path and to open said second flow path, whereby the quantity of liquid filled into said chamber and thereafter drained from said chamber into said reservoir is determined by the vertical spacing between said first and second sensor means, at least one of said sensor means being mounted for selective movement, and means responsive to the temperature of the liquid being measured for selectively displacing said movable sensor means to vary the vertical spacing between said sensors in said chamber thereby to vary the magnitude of said quantity of liquid with changes in its temperature.

2. The metering device of claim 1 wherein said temperature responsive means comprises an expansible bellows connected to said movable sensor means, said bellows being located in one of said flow paths.

3. The metering device of claim 2 wherein said bellows is located in said first flow path, said first flow path being bifurcated to provide a first branch through which liquid from said supply flows directly to said chamber and a second branch through which liquid from said supply flows past the exterior of said bellows and thence to said chamber.

4. The device of claim 2 wherein said bellows is of elongated configuration and is filled with a sample of the liquid being measured, the length of said bellows being the same as the vertical distance between said first and second sensor means.

5. The device of claim 1 including counter means, and means responsive to each operation of one of said sensor means for stepping said counter.

6. The metering device of claim 1 wherein said valve means comprises a ferrous metal ball located adjacent an orifice in said first flow path, a holding magnet adjacent said orifice for normally retaining said ball in position to close said orifice, a selectively energizable electromagnet disposed adjacent said ball, and means responsive to operation of said first sensor means for energizing said electromagnet to attract said ball away from said orifice against the force of said holding magnet thereby to open said first flow path to the flow of fluid from said fluid supply through said orifice.

7. The metering device of claim 6 comprising an adjustable stop disposed adjacent to but spaced from said ball for controlling the extent to which said ball may be moved away from said orifice by said electromagnet thereby to control the rate of flow through said orifice.

8. The metering device of claim 6 wherein said valve means comprises a second ferrous metal ball located adjacent a further orifice in said second flow path, said electromagent being positioned to attract said second ball toward said further orifice when said electromagnet is energized to close said second flow path substantially simultaneous with the opening of said first flow path.

9. The metering device of claim 8 including spring means for urging said second ball away from said further orifice when said electromagnet is de-energized.

10. The metering device of claim 1 wherein each of said sensor means comprises a magnetically responsive reed switch, a float in said chamber, said float carrying a permanent magnet for operating each of said reed switches in turn as the liquid level in said chamber changes, said valve means including an electromagnetic operator, and electrical circuit means responsive to operation of said reed switches for controlling the energization of said electromagnetic operator.

11. The metering device of claim 10 including electrically energizable pump means adjacent said reservoir for pumping liquid out of said reservoir, said electrical circuit means including time delay means responsive to sustained operation of the upper one of said reed switches for de-energizing said circuit means and said pump means.

12. The metering device of claim 1 wherein said first sensor means is located closely adjacent the bottom of said chamber whereby said first level corresponds to a substantially empty chamber condition.

13. The metering device of claim 12 wherein said measuring chamber and reservoir are each vented to permit the escape of air and vapors therefrom as liquid is supplied thereto.

14. An automatically operable, temperature-compensated, liquid metering device comprising a measuring chamber having a pair of liquid-level sensors therein disposed in vertically spaced relation to one another, means responsive to the absence of liquid in said chamber at a first level determined by the lower one of said sensors for supplying a liquid to be measured to said chamber, means subsequently responsive to the presence of liquid in said chamber at a second level determined by the upper one of said sensors for terminating the supply of liquid to said second chamber, means for initiating a withdrawal of liquid from said chamber substantially simultaneous with the termination of the supply of liquid to said chamber to drain liquid from said chamber until the liquid level in said chamber falls below said first level so as to cause termination of said withdrawal operation and to reinitiate the supply of liquid to said chamber, whereby fixed increments of liquid each of which is volumetrically dependent upon the vertical spacing between said sensors are repetitively and automatically supplied to and thereafter withdrawn from said chamber, counter means controlled by at least one of said sensors for counting the number of said increments, and means responsive to the temperature of the liquid being measured for selectively varying the relative spacing between said sensors thereby to vary the volumes of said increments with variations in the temperature of said liquid.

15. The metering device of claim 14 including electrically operable valve means for controlling the supply of liquid to and withdrawal of liquid from said chamber, said sensors including electrical switch means for controlling the operation of said valve means.

16. The metering device of claim 15 wherein said temperature responsive means comprises an elongated column of the liquid being measured, the length of said column being the same as the distance between said first and second levels.

* * * * *